(No Model.)

J. F. KELLY & C. C. CHESNEY.
ALTERNATING CURRENT MOTOR.

No. 508,721. Patented Nov. 14, 1893.

Witnesses:
Raphaël Netter
James Catlow

Inventors
John F. Kelly
C. C. Chesney
by Duncan & Page
Attorneys

UNITED STATES PATENT OFFICE.

JOHN F. KELLY AND CUMMINGS C. CHESNEY, OF PITTSFIELD, MASSACHUSETTS, ASSIGNORS TO THE STANLEY LABORATORY COMPANY, OF SAME PLACE.

ALTERNATING-CURRENT MOTOR.

SPECIFICATION forming part of Letters Patent No. 508,721, dated November 14, 1893.

Application filed January 16, 1893. Serial No. 458,471. (No model.)

*To all whom it may concern:*

Be it known that we, JOHN F. KELLY and CUMMINGS C. CHESNEY, citizens of the United States, residing at Pittsfield, in the county of Berkshire and State of Massachusetts, have invented certain new and useful Improvements in Alternating-Current Motors, of which the following is a specification, reference being had to the drawings accompanying and forming a part of the same.

Heretofore we have invented and pursued a plan of operating by alternating currents, electro-magnetic motors provided with commutators, by directing two alternating currents of different phases through the armature and field circuits respectively of such motors, and adjusting or proportioning the active resistance of the two circuits to cause such phases to correspond, in other words, to retard or accelerate the currents with respect to the impressed electro-motive force so as to produce an approximate difference of one hundred and eighty degrees or zero, under which conditions the currents could co-operate in producing the maximum torque. In this form of motor, as in fact, in all single motors provided with commutators when run by alternating currents, a defect exists, in that the quantity of energy transformed is not constant, for in each period there is a maximum and a zero point, so that while in a motor which has a commutator similar to that of a Gramme or Siemens machine, the torque is independent of the angular position of the armature, it still varies from instant to instant throughout the period. This we now propose to overcome by coupling two such motors together, rigidly or mechanically, and supplying the field of one from the same source as the armature of the other, so that the time of maximum torque for the one will coincide with that of minimum torque for the other, while their combined or resultant torque, as well as the energy transformed, will be constant.

This invention we may illustrate by conventional representations of motors, since the exact type of motor which we may employ, except as hereinbefore provided, is immaterial.

Figure 1:
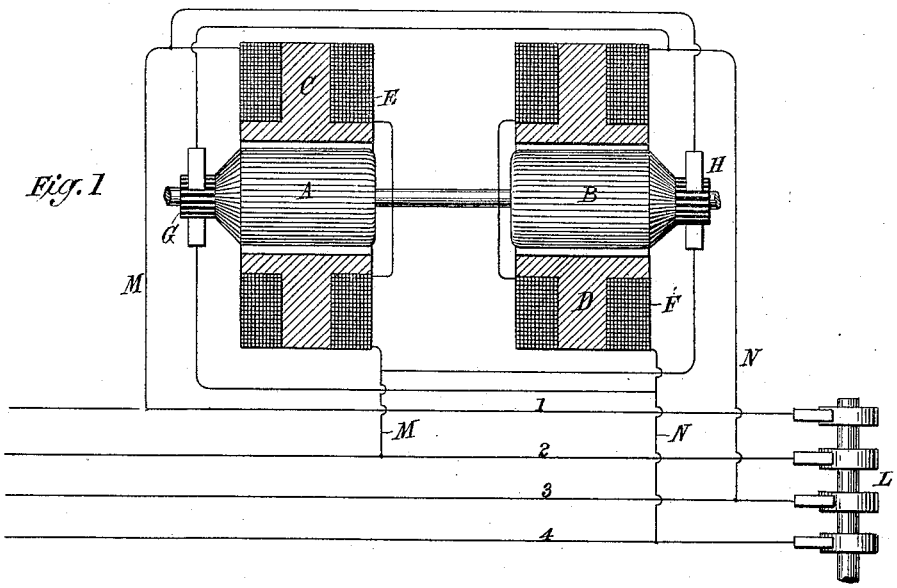
Figure 3:
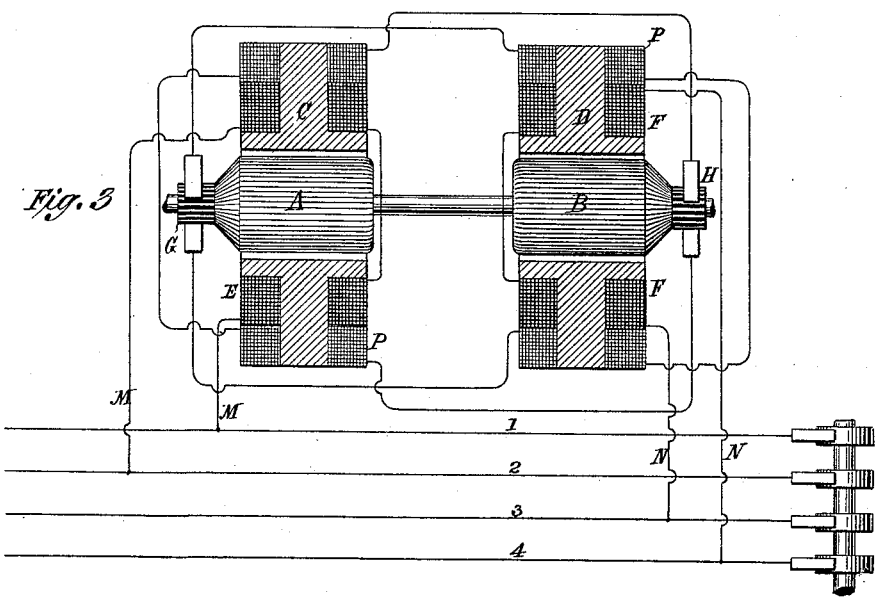
Figure 2:
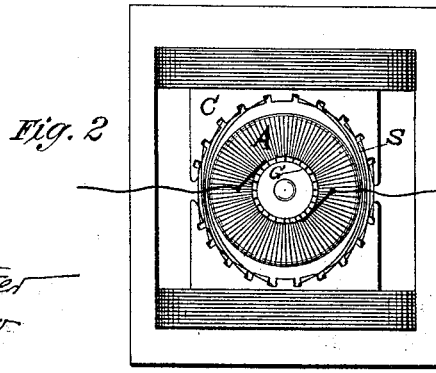

In the drawings, Figure 1 is a diagrammatic illustration of the invention. Fig. 2 is an end view of one of the motors, showing the general arrangement or construction of the same. Fig. 3 is a diagram of a modification of the invention.

Two motors, which by proper subdivision of their fields are adapted for operation with alternating currents, are supported on the same base, and have their armatures mounted on a common shaft, or are otherwise connected and combined in any of the well-known ways for securing the same results. Each motor is provided with an armature the coils of which are connected with the segments of a commutator, and the field cores are wound with the usual energizing coils.

We have designated the two armatures by the letters A and B; the field cores by C and D; the field coils by E and F, and the commutators by G and H.

L designates any source of or device for delivering two alternating currents differing in phase by as nearly as practicable ninety degrees, and the figures 1, 2, 3, 4 denote the conductors of the two circuits for conveying such currents. One of these circuits supplies current, as through a wire M, to one set of field coils E. The other supplies current to field coils F through a wire N. Both field circuits will operate to retard the energizing currents behind the impressed electro-motive force, but if the self-induction or active resistance of the two be alike the relative difference of phase between them will be preserved, one being maximum at the instant that the other is zero.

If the armature A be supplied with current through its commutator G from the same source as its field C, it is obvious that by reason of its different self-induction some special provision would be required to make its phases accord or correspond with those of the field, but if it be supplied with current from the same source as the field D, the same conditions operate to cause its phases to more nearly correspond with those of its field, in the sense that they will be more nearly one hundred and eighty degrees or zero apart and hence capable of co-operating to produce the maximum torque. Obviously the same conditions hold for the other armature of each motor to the circuit supplying the current for the field of the other.

The adjustment of the relative self-induction of the field and armature circuits is a matter well understood. As one device for this purpose we employ the stationary neutralizing coils S parallel to the armature coils.

In case it should be desirable to work the fields and armature at different voltages, the complication of separate transformers may be avoided by inducing the currents for the armatures by the field coils themselves. This we accomplish by winding secondary coils on the fields and closing the secondary on the field of each motor through the armature coils of the other, as is represented in Fig. 3, where P P represent the secondary field coils.

In any case it is evident that the armature current may be either derived or induced from the circuit supplying the field on the other side of the motor.

What we claim is—

1. The combination with a source of alternating currents which differ in phase and supply or line circuits therefrom, of two commutating motors rigidly or mechanically coupled together and connected with the said line circuits so that the armature of each will be supplied with current from the same circuit as the field of the other, as set forth.

2. The combination of two commutating motors rigidly or mechanically coupled together, a source of alternating currents which differ in phase, two line or supply circuits therefrom and including the field coils of the motors respectively, and circuits each derived from one field circuit and including the armature coils of the other, as set forth.

JOHN F. KELLY.
CUMMINGS C. CHESNEY.

Witnesses:
WILLIAM STANLY, Jr.,
W. B. TOBEY.